Nov. 12, 1935. H. A. GLASSER Re. 19,752

REFRIGERATOR

Original Filed Jan. 7, 1933

INVENTOR.
Harold A. Glasser
BY Mock & Blum
ATTORNEYS.

Reissued Nov. 12, 1935 Re. 19,752

UNITED STATES PATENT OFFICE 19,752

REFRIGERATOR

Harold A. Glasser, Jackson Heights, N. Y., assignor to Bruno-New York, Inc., New York, N. Y., a corporation of New York Original No. 1,927,398, dated September 19, 1933, Serial No. 650,675, January 7, 1933. Application for reissue December 11, 1934, Serial No. 757,023

5 Claims. (Cl. 62—89)

My invention relates to a new and improved refrigerator.

One of the objects of my invention is to provide a new and improved refrigerator of the iceless type, in which the refrigeration is supplied by any suitable mechanical or chemical unit. My invention applies particularly to the well-known electrical refrigerator, refrigerators of the "Electro-Lux" type, etc.

One of the objects of my invention is to provide a refrigerator of this type with a special compartment at the open end thereof.

Another object of my invention is to provide a compartment of this type which is mounted upon a suitable hinge and which is at or adjacent the inner face of the door of the refrigerator.

Another object of my invention is to provide a compartment of this type which is constructed so as to produce a temperature therein which may be the same or which may be higher than the temperature within the main part of the refrigerator.

Other objects of my invention will be set forth in the following description and drawing which illustrates a preferred embodiment thereof, it being understood that the above general statement of the objects of my invention is intended merely to generally explain the same and not to limit it in any manner.

Figure 1:
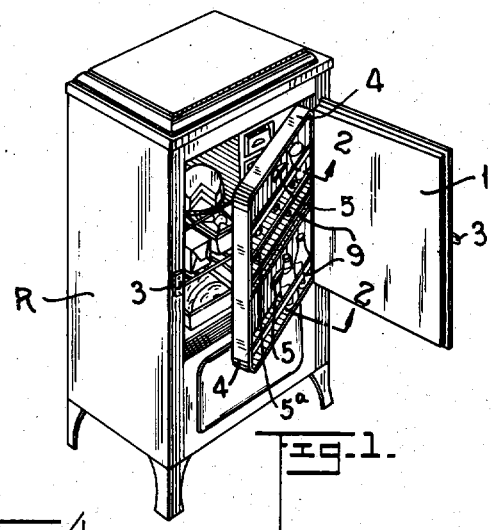
Fig. 1 is a perspective view illustrating one embodiment of my invention.
Figure 2:
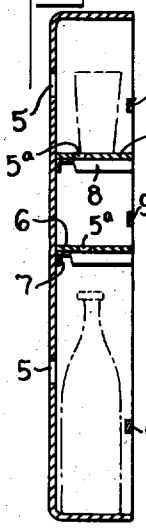
Fig. 2 is a sectional view on the line 2—2 of Fig. 1.

The refrigerator R may be of any suitable type, and it is provided with a door 1 which is mounted upon a hinge 2. Said door and hinge may be of any suitable type. The door 1 is held in the closed position by means of a latch 3 of any suitable type. As shown in Fig. 1, the refrigerator has a main compartment, having cooling means in the upper part thereof.

Figure 4:
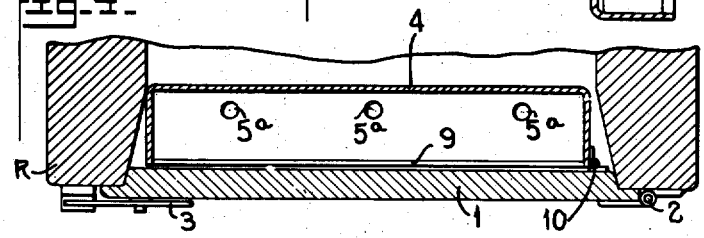
Fig. 4 is a horizontal sectional view of the device shown in Fig. 1.

In the embodiment illustrated in Figs. 1 and 4, the compartment 4 is made of any suitable metal and said compartment has its rear wall provided with one or more openings or louvres 5 of any suitable type, so that there is, a circulation of refrigerated air between the interior of the compartment 4, and the main body or compartment of the refrigerator.

The compartment 4 is provided with shelves 6 of any suitable construction. The rear wall of the compartment may be provided with angle irons 7 upon which the rear ends of the shelves 6 may be located. Said shelves 6 may have flanges 8 which are welded or otherwise suitably secured to the side walls of the compartment. Said shelves may have openings 5a, which may vary in number, in order to facilitate the circulation of air through compartment 4. Said shelves may be connected adjustably to the side walls of compartment 4.

Figure 3:
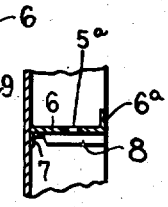
Fig. 3 is a detail sectional view showing a different type of shelf having a lip or flange at its front end.

In the construction shown in Fig. 3, the shelves 6 have lips or flanges 6a at their front ends. The compartment is likewise provided with front rails 9 which are suitably connected to the side walls of said compartment.

This construction makes it possible to locate glasses, bottles, and the like upon the shelves of the compartment. For example, the compartment can be used for holding containers of beverages, sauces, and the like, which become too cold when they are placed within the main body of the refrigerator. This excessive chilling is often undesirable, especially in mayonnaise, dressings and the like.

In the embodiment shown in Fig. 4, the compartment 4 is connected by means of a hinge 10 to the inner face of the door 1. There may be enough friction in the hinge 10 so that the door 1 and the compartment 4 will open in unison.

Figure 5:
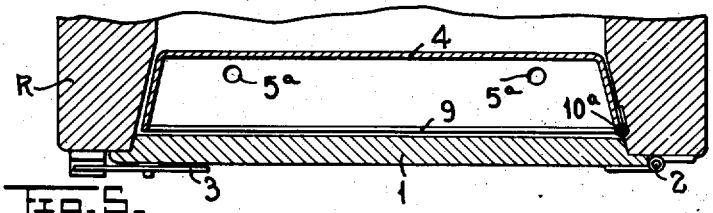
Fig. 5 is a view similar to Fig. 4 showing a different embodiment.

In the embodiment shown in Fig. 5, the compartment 4 is connected by means of a hinge 10a to one of the side walls of the refrigerator. Likewise, in this embodiment, the compartment has a tapered shape so that it fits closely in the opening of the refrigerator.

The compartment may be made of any suitable material such as steel which may have the thickness of 18 to 20 gauge.

Experience has shown that since the compartment has a relatively solid rear wall, provided with relatively small openings 5, the temperature within the compartment is several degrees higher than in the main body of the refrigerator. However, I do not wish to be restricted to any particular size or number of the openings 5. I prefer that said openings 5 should not occupy more than about twenty-five percent of the total area of the rear wall of the compartment 4.

Generally speaking, my invention applies to all refrigerators of the type in which the normal temperature of the refrigerator is maintained as low as 20° F.

In an ordinary domestic refrigerator, the lowest temperature which is maintained is about 40° F. Certain foods, such as oily salad dressings, should be kept at a temperature which is not below about 50° F. Likewise, foods which contain a large percentage of water, such as plums or peaches, should not be chilled to 40° F., as they become inedible. By having the areas of the openings 5 sufficiently small, it is possible to maintain a temperature of about 50° F. in the compartment 4, although the interior of the refrigerator is maintained at a normal minimum temperature of 40° F. If the area of openings 5 is about 25% (twenty five per cent) of the total area of the rear wall of compartment 4, there is little or no difference in temperature between compartment 4 and the interior of the refrigerator. While exact figures cannot be given for every style of refrigerator, because of variation in freezing capacity, etc., if the area of openings 5 is about ten per cent of the total area of the rear wall of compartment 4, it is possible to keep the interior of compartment 4 about 10° F. higher than the interior of the refrigerator. If desired, the compartment 4 can be made of porcelain-covered steel, so that the wall of said compartment provides sufficient insulation, so as to make it possible to keep compartment 4 at a higher temperature than the interior of the refrigerator.

The relatively higher normal temperature of compartment 4 can therefore be regulated by varying the size of openings 5, which can be done by any suitable regulating means.

It is important to have top and bottom openings 5, at the top and bottom of the rear wall of compartment 4, in order to provide circulation of air between the compartment 4 and the interior of the refrigerator.

If desired, the wall of the compartment 4 may consist either wholly or in part of any suitable insulating material so as to maintain a difference of temperature between the interior of said compartment and the interior of the refrigerator.

I have shown a preferred embodiment of my invention, but it is clear that numerous changes and omissions can be made without departing from its spirit.

I claim:

1. An iceless refrigerator having a main compartment which is provided with an outer door, said main compartment having cooling means in the upper part thereof, and a box-like member having a back which is surrounded by a peripheral flange, said box-like member being turnably mounted by a hinge which is located adjacent the inner surface of said outer door, and means located so as to provide a circulation of refrigerated air between said box-like member and said main compartment.

2. An iceless refrigerator having a main compartment which is provided with an outer door, and a box-like member having a back which is surrounded by a peripheral flange, said box-like member being turnably mounted by a hinge which is located adjacent the inner surface of said outer door, said box-like member having superposed openings so that there is a circulation of refrigerated air between said main compartment and the interior of said box-like member.

3. An iceless refrigerator having a main compartment which is provided with an outer door, and a box-like member having a back which is surrounded by a peripheral flange, said box-like member being turnably mounted by a hinge which is located adjacent the inner surface of said outer door, said box-like member being provided with superposed openings so that there is a circulation of refrigerated air between said main compartment and the interior of said box-like member, said box-like member having perforated shelves which permit the circulation of the air.

4. An iceless refrigerator having a main compartment which is provided with an outer door, and a box-like member having a back which is surrounded by a peripheral flange, said box-like member being turnably mounted by a hinge which is located adjacent the inner surface of said outer door, said box-like member being perforate, the perforated portion of said box-like member being sufficiently small in relation to the entire area of the wall of said member so that the temperature which is maintained within said box-like member is normally higher than the temperature which is normally maintained within said main compartment.

5. An iceless refrigerator having a cooling compartment in which a refrigerating unit is located and which is provided with an outer door, an additional inner member which is located behind said outer door when said outer door is closed, said inner member being turnably mounted by a hinge which is located adjacent the inner surface of said outer door when said outer door is closed, so that an outer portion of said compartment is located between the adjacent walls of said inner member and of said outer door when said outer door is closed, said outer portion of the compartment being of less depth than the inner and remaining portion of said compartment, one of said adjacent walls having shelf means, said inner member being shaped to permit an exchange of refrigerated air between said inner portion of the compartment and the outer portion of the compartment.

HAROLD A. GLASSER.